United States Patent [19]

Cannon

[11] 4,428,692
[45] Jan. 31, 1984

[54] HIGH SPEED IMPACT MATRIX PRINTER

[75] Inventor: Jack W. Cannon, Boca Raton, Fla.

[73] Assignee: International Business Machines Corporation, Armonk, N.Y.

[21] Appl. No.: 370,792

[22] Filed: Apr. 22, 1982

Related U.S. Application Data

[63] Continuation of Ser. No. 164,257, Jun. 30, 1980, abandoned.

[51] Int. Cl.³ .............................................. B41J 3/12
[52] U.S. Cl. ................................. 400/124; 101/93.05
[58] Field of Search ............ 400/121, 124, 125, 125.1; 101/93.04, 93.05

[56] References Cited

U.S. PATENT DOCUMENTS

| | | | |
|---|---|---|---|
| 1,018,115 | 2/1912 | Kinsley | 400/118 X |
| 1,053,042 | 2/1913 | Kinsley | 178/30 |
| 1,108,580 | 8/1914 | Hulfish | 178/30 |
| 1,126,339 | 1/1915 | Ashley et al. | 178/30 |
| 3,099,711 | 7/1963 | Foley et al. | 400/125.1 X |
| 3,190,957 | 6/1965 | Foley et al. | 400/125.1 X |
| 3,267,845 | 8/1966 | Simshauser | 101/93.04 |
| 3,330,208 | 7/1967 | Eckel | 101/93.04 |
| 3,444,975 | 5/1969 | Simshauser | 400/125.1 |
| 3,802,544 | 4/1974 | Howard et al. | 400/124 |
| 3,952,153 | 4/1976 | Nijenhuis et al. | 178/30 |
| 3,973,662 | 8/1976 | Fulton | 400/124 |
| 4,053,878 | 10/1977 | Cannon | 178/15 X |
| 4,079,824 | 3/1978 | Ku | 400/124 |
| 4,096,578 | 6/1978 | Malkemes | 364/900 |
| 4,159,882 | 7/1979 | Sanders et al. | 400/124 |

FOREIGN PATENT DOCUMENTS 52-30121  3/1977  Japan ................................. 400/121

Primary Examiner—Paul T. Sewell
Attorney, Agent, or Firm—Richards, Harris & Medlock

[57] ABSTRACT

An improved high speed impact matrix printer is provided for use with data processing systems and digital communication systems. In the serial wire matrix printer (10) of the preferred embodiment, a printhead (36) has print wires (90) arranged as a column within a wire guide (88). The printhead (36) is stepped serially across a print record, and print wire drivers (68) fire the print wires (90) in accordance with character configuration information in storage to effect the printing of a line of characters. The impact head of each print wire (90) is elongated with its longitudinal dimensions extending in the direction of relative movement of the printhead (36) along the print line. The elongated impact head of the print wire (90) extends over a plurality of print firing locations of a matrix character pattern to reduce the number of times the print wire drivers (68) must fire the print wires (90) to print a character.

9 Claims, 71 Drawing Figures

HIGH SPEED IMPACT MATRIX PRINTER

This is a continuation of application Ser. No. 164,257 filed June 30, 1980 now abandoned.

TECHNICAL FIELD

The present invention pertains to an improved impact matrix printer, and more particularly to an impact matrix printer having a printing element with an elongated impact head extending over a plurality of print firing locations of a matrix character format.

BACKGROUND ART

Impact matrix printers are well known in the art and are typically used as high speed printers in conjunction with electronic data processing systems or digital communications systems. Impact matrix printers known in the art include serial wire matrix printers, bar matrix printers and helix matrix printers. In such existing impact matrix printers, a character is formed from the visual impression of dots or squares on the print record arranged in accordance with a matrix character pattern.

An illustration of the operation of an existing impact matrix printer may be provided by describing a serial wire matrix printer. A serial wire matrix printer has a printhead comprised of a column of print wires stepped serially across a print record to print a line of characters. Electrical signals derived from a data processing or digital communication system control the selective firing of a print hammer, causing selected wires in the printhead to be driven against an inked ribbon to form an inked impression upon the print record. Character configuration information for a font of characters formed in accordance with a matrix character pattern is placed in storage, and the electrical control signals activate the print hammers firing the print wires in accordance with the character configuration information. Upon completion of a line of print, the print record is advanced to the next line and the printhead is returned to its starting position.

Wire matrix printers now generally utilize a circular impact wire printing element in conjunction with a 7×7 restricted matrix character pattern to form the character images of a font of characters. The total character matrix is ten positional units wide, providing three positional units between adjacent characters. The matrix character pattern restriction is such that any dot defined as "on" must be horizontally adjacent to an "off" dot, so that no two horizontally adjacent dots can exist within the character matrix for the font of characters. While a single dot may exist in any one of the seven discrete positions along a row, this matrix pattern allows for a maximum of only four dots to exist within one horizontal row. This pattern guarantees a minimum defined "off" time to allow for print hammer recovery, which allows the printhead to move at twice the speed it would if each of the seven dots in the 7×7 matrix was printed.

It is of course advantageous to operate a printer at the highest print speeds possible without a reduction in print quality. Current high speed matrix printers are limited by the mechanical restraints of the incremental actuation of the print hammers of the matrix printer fired in response to electrical control signals. A need has thus arisen for increasing the speed of an impact matrix printer while maintaining print quality.

In accordance with the present invention, a matrix printer includes a printhead having an elongated impact member and a matrix character pattern which requires fewer strokes to form a character. The horizontal character matrix for the font of characters is divided into a larger number of time increments in which the impact member covers more of the timing increments to increase the speed of printing. The total character matrix is twenty units wide and has thirteen adjacent units within the matrix as possible positions for firing the print hammer. A storage element is used to store the basic print hammer firing information for forming each of the characters. The restricted matrix pattern restricts the hammer from firing any sooner than six positional units or not more than three times per character. Thus, the present invention enables a matrix printer to operate at an increase in speed over existing matrix printers while maintaining the clarity of the printed characters.

BRIEF DESCRIPTION OF DRAWINGS

For a complete understanding of the present invention and the advantages and features thereof, reference is now made to the accompanying Detailed Description taken in conjunction with the following figures in which.

DETAILED DESCRIPTION

Figure 1:
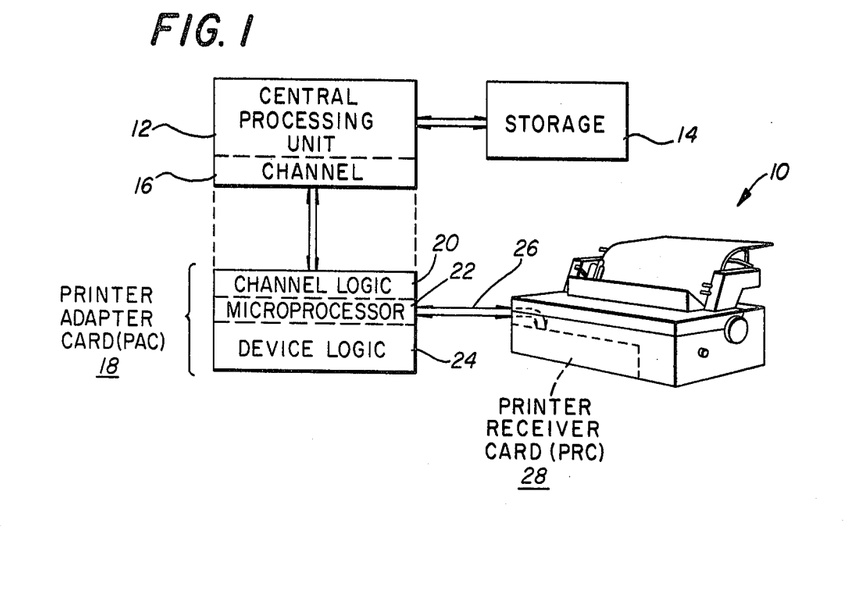
FIG. 1 is a block diagram of an electronic data processing system for use with an attached serial matrix printer incorporating the improvements of the present invention.

FIG. 1 illustrates a typical electronic data processing system which may be used in conjunction with a high speed serial wire matrix printer 10 of the present invention. While the present invention is described in use with a serial wire matrix printer, it will be understood by those skilled in the art that the principles of the invention may be applied to other types of impact matrix printers.

The data processing system illustrated in FIG. 1 is analogous to the system configurations that are possible with the IBM (Registered Trademark, International Business Machines Corporation) Series/1 System. A central processing unit (CPU) 12 has associated storage facilities 14 and channel facilities 16. A printer adapter card 18, comprising channel logic 20, a microprocessor 22 and device logic 24, is connected to the central processing unit 12. The printer adapter card 18 is interconnected through a cable 26 to a printer receiver card 28 and through it to the serial wire matrix printer 10.

The central processing unit 12 issues input/output (I/O) commands to the wire matrix printer 10 through the printer adapter card 18 and receives status information and action completed information in return. The cable 26 incorporates a number of wires which are less than the total number of significant data bits required to transfer character image information and functional information to the wire matrix printer 10. The printer adapter card 18 transfers characters from the storage facility 14 and converts them into the corresponding matrix pattern to be printed. The program in the printer adapter card 18 can define the length of the forms and the overflow line on the forms.

The channel logic 20 allows signals to pass back and forth between the central processing unit 12 and the printer adapter card 18 to control the direction and type of data flow. The microprocessor 22 of the printer adapter card 18 controls the operation of the wire matrix printer 10, performs tests on conditions and status, and presents interrupt requests.

A print data buffer holds one line of data to be printed (maximum of 132 characters). The characters are stored in eight bit EBCDIC (Extended Binary Coded Decimal Interchange Code) and are transferred from the main storage 14 two bytes at a time. A wide image buffer generates printed characters by determining which print wires should be fired to form the character impressions.

The printer adapter card 18 functions as the connector between the central processing unit I/O channel 16 and the wire matrix printer 10, performing the following functions:

1. Interprets and executes commands from the channel.
2. Provides a path for data between the channel and the printer.
3. Transfers data in parallel one or two bytes at a time.
4. Furnishes status information to the channel and reports conditions codes after I/O instructions and during interrupts.
5. Checks the accuracy of transferred data.
6. Converts characters from storage into character matrix impressions.
7. Selects direction of printing by determining which end of the line to be printed is closest to the present printhead position.

The central processing unit 12 and its associated input and output devices are generally characterized as a minicomputer. The IBM 4953 processors, models A or B, or the IBM 4955 processors, models A or B, can operate as the central processing unit 12 and its associated channel 16. The IBM 4974 printer and its attachment feature are analogous to the serial wire matrix printer 10 and the printer adapter card 18. Other impact matrix printers may be substituted for the serial wire matrix printer 10 in practicing the present invention.

Figure 2:
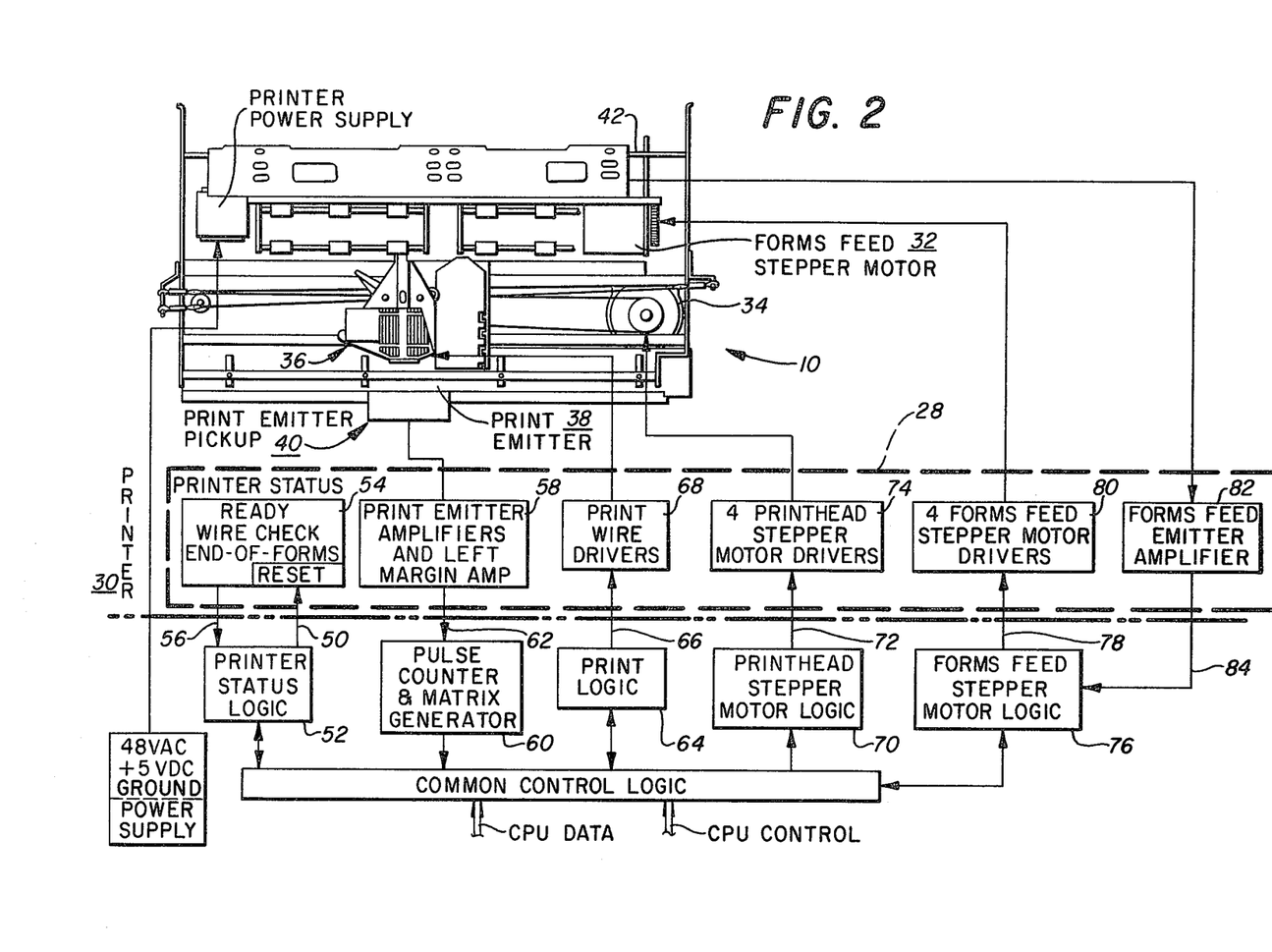
FIG. 2 illustrates the serial matrix printer of FIG. 1 together with blocks representing certain printer logic functions controlling its operation.

FIG. 2 illustrates in a schematic way the serial wire matrix printer 10 together with blocks representative of certain printer logic operations to illustrate the basic data flow. The wire matrix printer 10 and printer receiver card 28 incorporate the items located above line 30, while the items located below the line 30 include printer logic operations of the printer adapter card 18 and central processing unit 12. The printer 10 includes two stepper motors, a forms feed stepper motor 32 for driving the forms feed mechanism and a printhead stepper motor 34 for driving a printhead 36. The motors 32 and 34 are under the control of the printer adapter card 18. A print emitter 38 and print emitter pickup 40 determine where the printhead 36 is positioned along the print line and in which direction it is moving. A forms feed emitter 42 determines how far the forms have advanced in the printer 10.

A reset signal 50 from the printer status logic 52 is applied to the Ready, Wire Check, End-Of-Forms block 54 to reset the wire check latch in the printer 10. The printer 10 in turn supplies the printer status logic 52 with the printer status on line 56 to indicate the status of the printer such as: a Ready signal indicating the printer 10 is operational; a Wire Check signal indicating a print magnet driver has been turned on too long; and an End-Of-Forms signal indicating the presence or absence of forms.

Print emitter amplifiers and left margin amplifier 58 amplify the signal from the print emitter 38 to signal the pulse counter and matrix generator 60 on line 62, indicating the position and direction of the printhead 36. Print wire signals from print logic 64 are applied on the line 66 to the print wire drivers 68 to fire the print magnets in the printhead 36. Printer stepper motor signals from printhead stepper motor logic 70 are applied on the line 72 to the four printhead stepper motor drivers 74 to the printhead stepper motor 34. The signals applied from the printhead stepper motor logic 70 cause the printhead 36 to be moved left or right along the print line. Signals from forms feed stepper motor logic 76 are applied on the line 78 to the four form feeds stepper motor drivers 80 to cause the forms feed stepper motor 32 to advance the form to the next line or to eject the form. The forms feed emitter 42 applies a signal to a forms feed emitter amplifier 82 to signal the forms feed stepper motor logic 76 on line 84 as to how far the forms have advanced.

The serial wire matrix printer 10 typically operates at 120 characters per second (cps), prints up to 132 characters per line, prints 10 characters per 2.5 four centimeters (one inch) with a maximum line length of 33.5 cm (13.2 inches). The printer 10 may also print six lines per 2.54 cm (one inch) and spaces or skips six lines per 2.54 cm (one inch) with a maximum of 84 lines per command. The printer 10 has no keyboard, keys or lights or other controls similar to those of a typewriter. A power switch turns the printer 10 ON and OFF.

Figure 3:
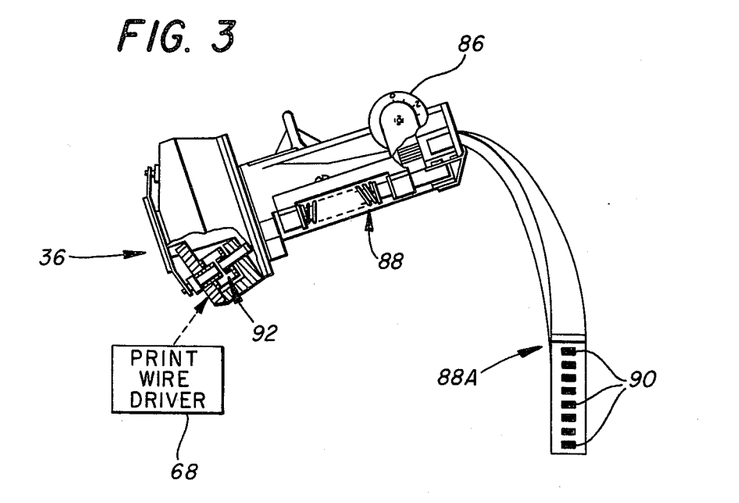
FIG. 3 illustrates the printhead in the serial matrix printer of the present invention.

FIG. 3 illustrates the printhead 36 of the printer 10. The printhead 36 is moved along the print line by the printhead stepper motor 34 under the control of the printer adapter card 18. A copy control dial 86 adjusts the printhead 36 for the various thicknesses of the forms. A wire guide 88 includes a columnar housing 88A for guiding each of the eight print wires 90. The first seven print wires 90 are aligned with the rows of the matrix character pattern for forming the font of characters illustrated in FIGS. 4–70. The eighth print wire 90 may be used by the printer 10 for underscoring.

Each of the print wires 90 is actuated by a print wire driver 68 actuating a print coil 92. The print wire drivers 68 are turned on by the control of the printer adapter card 18 for causing selected ones of the print wires 90 to be actuated and driven against an inked ribbon to form a portion of the matrix pattern for a character.

The impact heads of the print wires in prior art matrix printers have generally been circular in shape. The impact of the head of the print wires upon the inked ribbon and in turn the document causes a dot matrix character pattern to be formed. Current wire matrix printers utilizing a circular impact print wire element form the characters on a 7×7 restricted matrix pattern. In horizontally stepping the printhead along the print line, the restricted matrix pattern of the character font was such that any dot defined as "on" had to be horizontally adjacent to a "off" dot. In this way no two horizontally adjacent dots could exist within the character matrix. Such a character matrix pattern for the font of characters permitted a maximum of only four dots to exist horizontally within a row, while a single dot could exist in any one of the seven discrete impact areas of the character matrix pattern. The "off" time defined by the restrictive matrix pattern allowed the print hammer to recover and the printhead to be moved at twice the speed it would if each of the seven dots had to be printed.

The print wires 90 of the present invention have a rectangularly shaped impact head, whereby the inked impression created by one of the print wires 90 striking the inked ribbon is an elongated print bar. The impact head of print wires 90 has its longitudinal dimension extending in the horizontal direction of movement of the printhead 36 along the print line.

Figure 4:
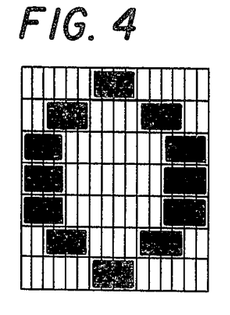
FIGS. 4–70 illustrate the matrix character patterns for a preferred font of characters for the serial matrix printer of the present invention.
Figure 5:
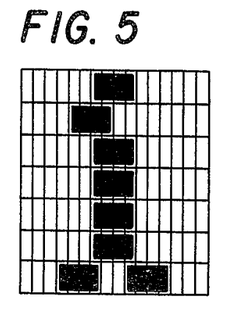
Figure 6:
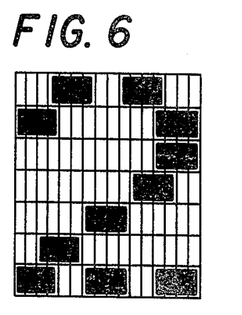
Figure 7:
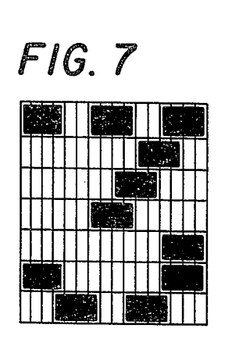
Figure 8:
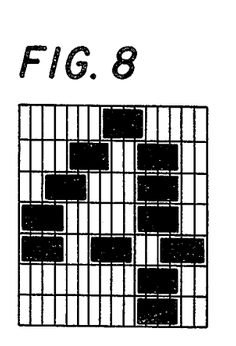
Figure 9:
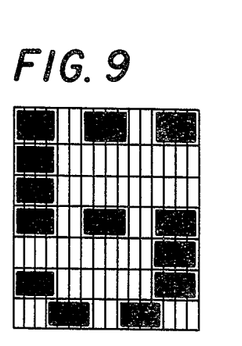
Figure 10:
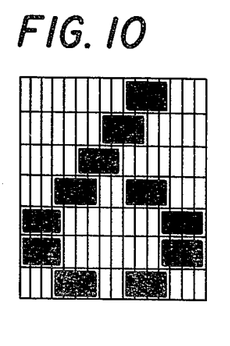
Figure 11:
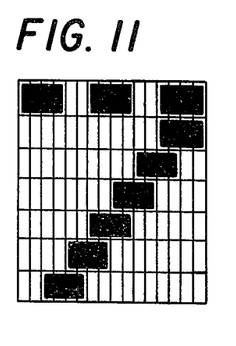
Figure 12:
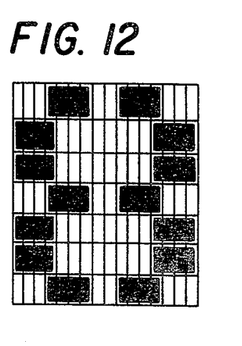
Figure 13:
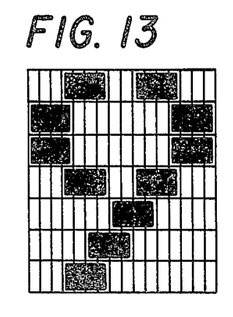
Figure 14:
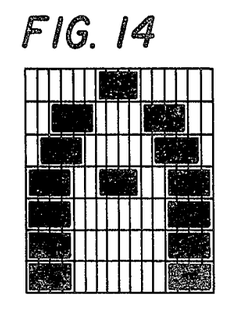
Figure 15:
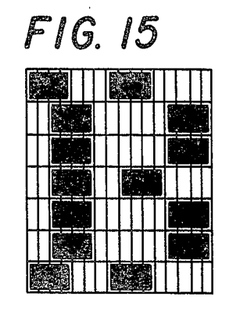
Figure 16:
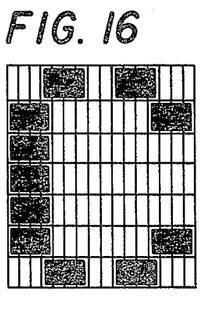
Figure 17:
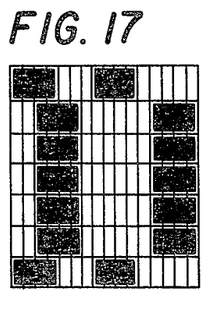
Figure 18:
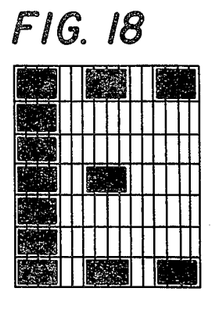
Figure 19:
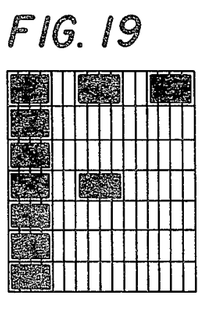
Figure 20:
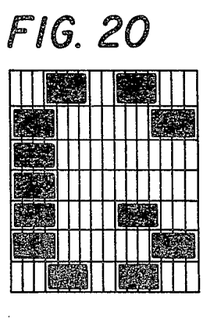
Figure 21:
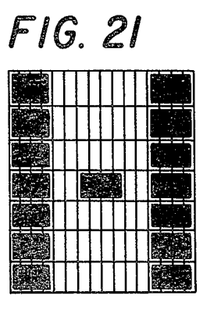
Figure 22:
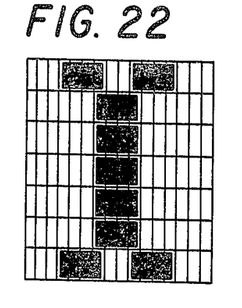
Figure 23:
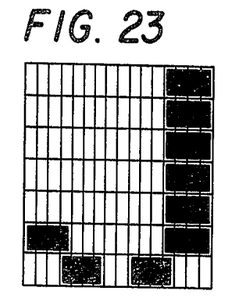
Figure 24:
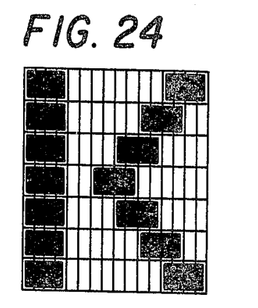
Figure 25:
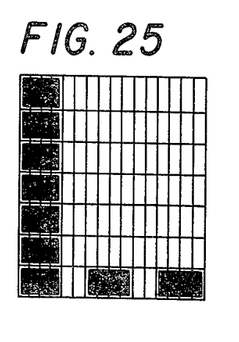
Figure 26:
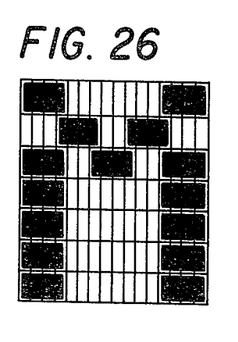
Figure 27:
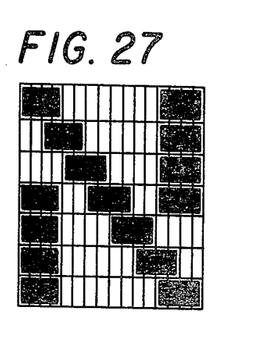
Figure 28:
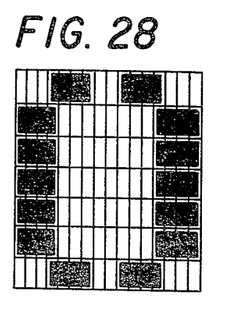
Figure 29:
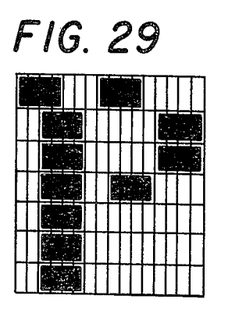
Figure 30:
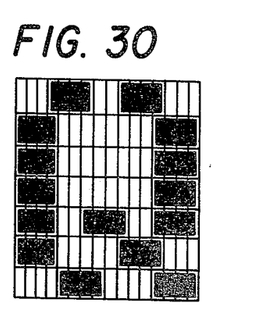
Figure 31:
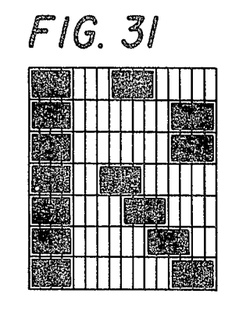
Figure 32:
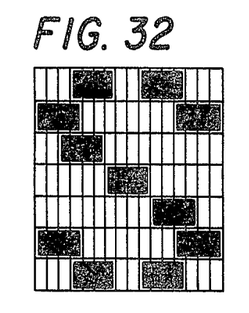
Figure 33:
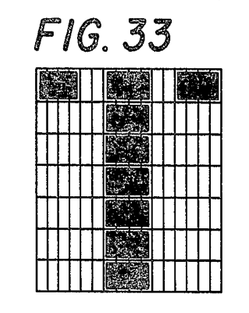
Figure 34:
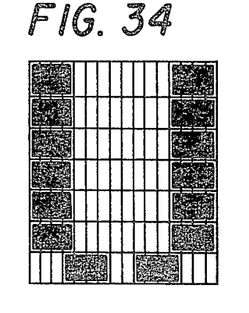
Figure 35:
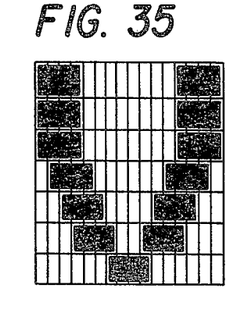
Figure 36:
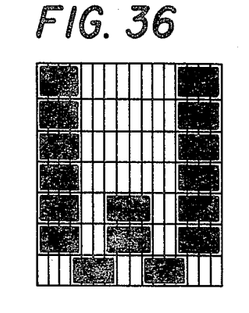
Figure 37:
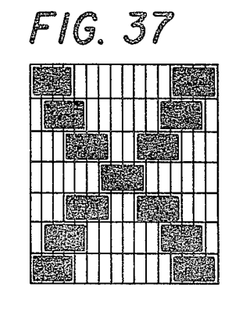
Figure 38:
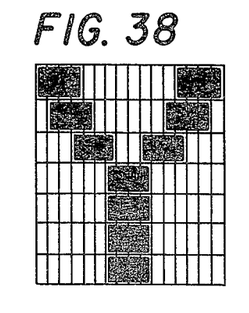
Figure 39:
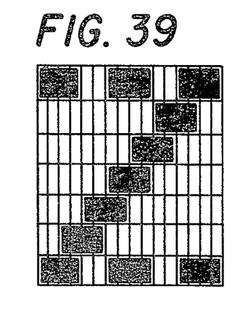
Figure 40:
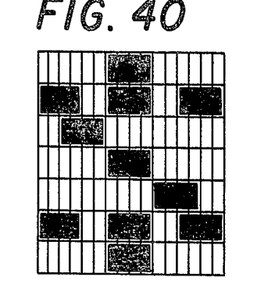
Figure 41:
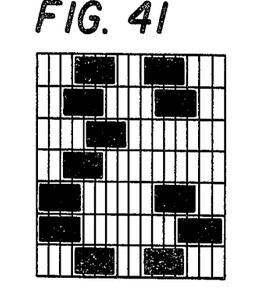
Figure 42:
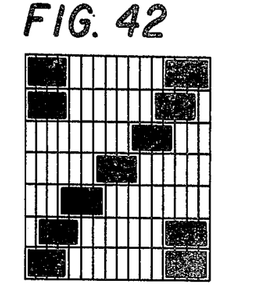
Figure 43:
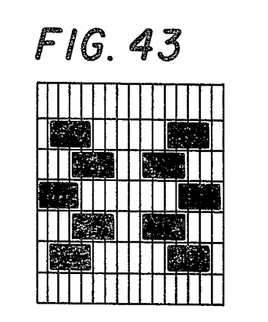
Figure 44:
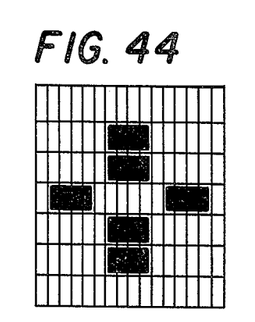
Figure 45:
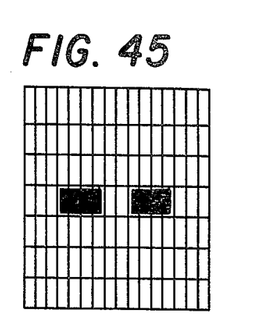
Figure 46:
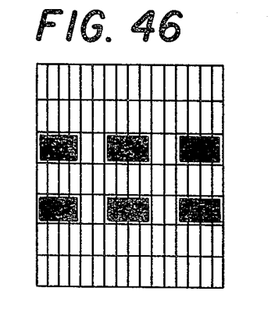
Figure 47:
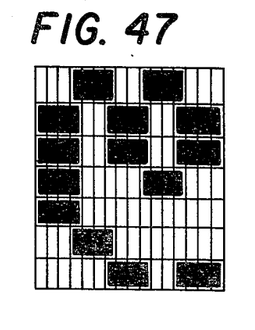
Figure 48:
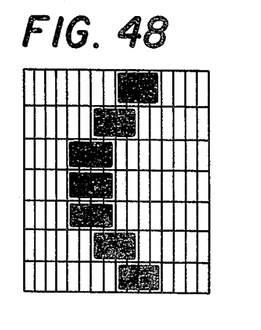
Figure 49:
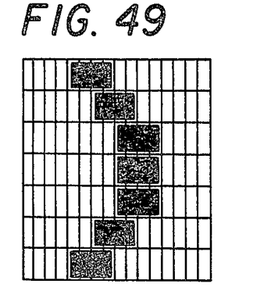
Figure 50:
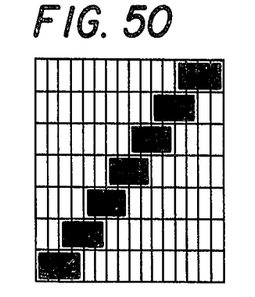
Figure 51:
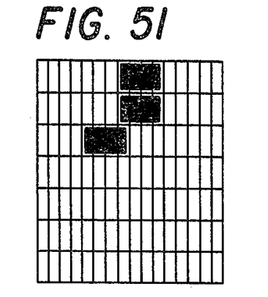
Figure 52:
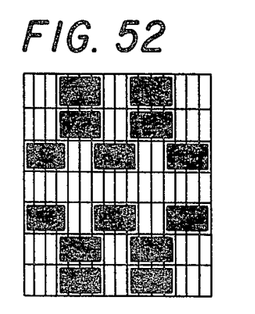
Figure 53:
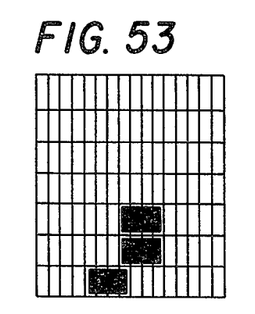
Figure 54:
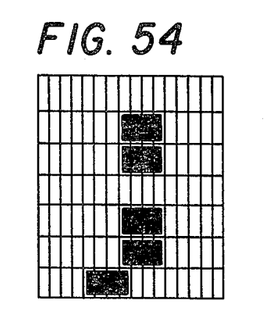
Figure 55:
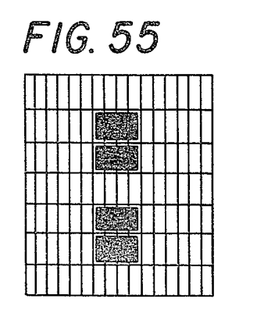
Figure 56:
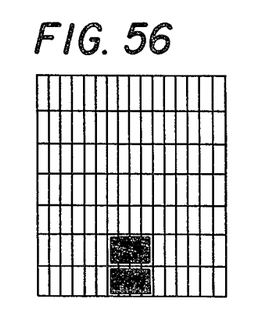
Figure 57:
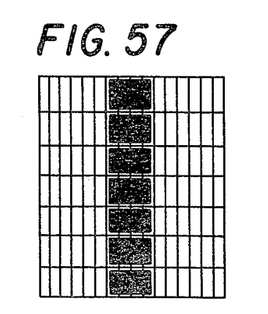
Figure 58:
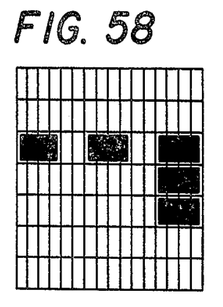
Figure 59:
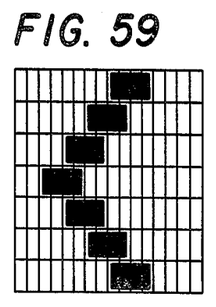
Figure 60:
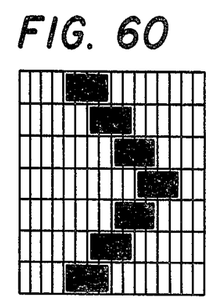
Figure 61:
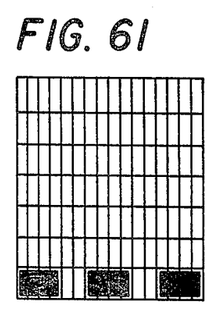
Figure 62:
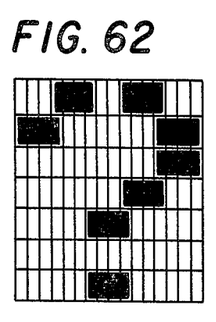
Figure 63:
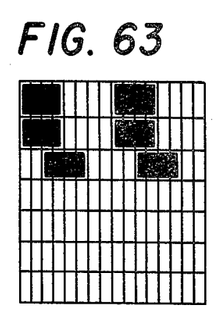
Figure 64:
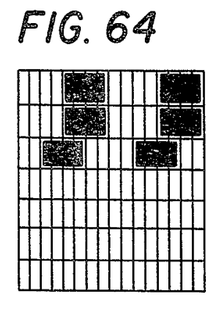
Figure 65:
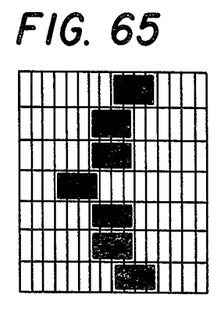
Figure 66:
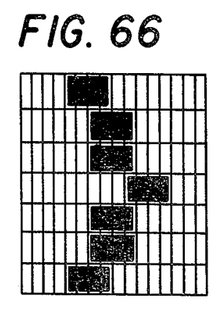
Figure 67:
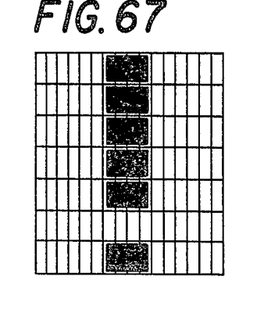
Figure 68:
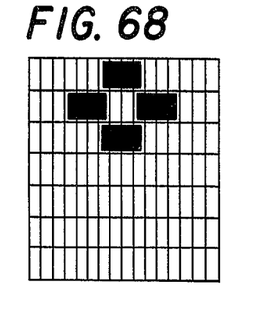
Figure 69:
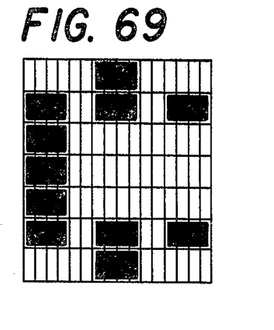
Figures 70, 71:
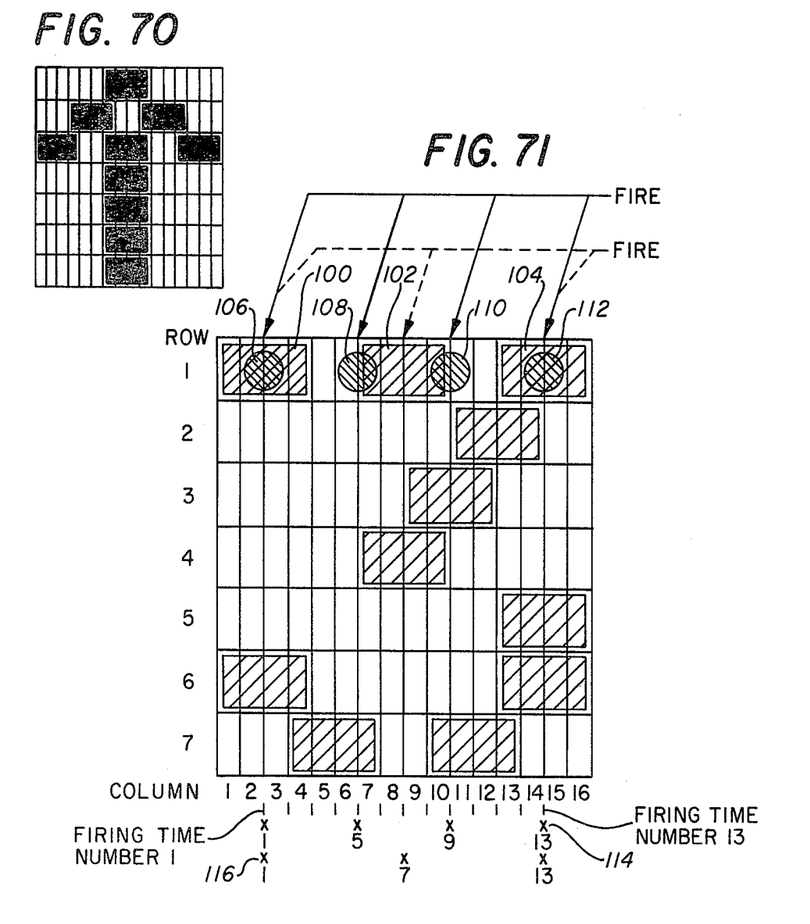
FIG. 71 illustrates the print hammer firing times for the first row of the character "3" for the matrix character pattern of the present invention in contrast with the first row of the matrix character pattern for an existing dot matrix printer.

FIGS. 4–70 illustrate a matrix character pattern for a font of characters which may be formed by the utilization of the print wires 90 of the present invention in a serial wire matrix printer 10. The total character matrix of each of the characters in FIGS. 4–70 is twenty units wide with thirteen adjacent units within the matrix for use in firing the print wire drivers 68. The basic character image information for firing the print wire drivers 68 representing each of the characters illustrated in FIGS. 4–70 is placed in storage. The matrix pattern for forming any of the characters of FIGS. 4–70 is such that the print hammer controlled by the print wire drivers 68 is restricted from firing any sooner than six positional units, or more than three times per character. This is contrasted to the restricted matrix pattern of present dot matrix printers in which four dots may exist horizontally within a row to form a character.

The oblong or rectangular impact head of the print wire 90 produces a print bar instead of a print dot. The print bar may be approximately 0.015 inches high and 0.020 inches wide. The actual width of the print bar must be narrower than 0.030 inches so that a distinct "off" spot is visible between the three vertical segments of the character "W" in rows five and six. The width of the print bar and the accompanying figures is 0.020 inches so the printed bar occupies or overlaps four positional units and the printed character occupies a total of sixteen of the twenty available positional units, creating a 20% separation gap between characters.

FIG. 71 compares the character matrix printing pattern of a prior art dot matrix printer with the character matrix pattern utilized in the present invention. For purposes of comparison, the first row of the number "3" has the print bar impressions 100, 102 and 104 of the present invention overlaying the dots 106, 108, 110 and 112 representing the character matrix pattern of a prior art dot matrix printer. The matrix pattern illustrated has seven rows and sixteen vertical positional units for positioning the printed character. The firing time for the signals applied from the print wire drivers 68 to the print coils 92 may occur in any one of the thirteen positional units indicated in FIG. 71. In the dot matrix printer, the print firing signals 114 fire the print coils four times, at the times represented by positional indicators 1, 5, 9, and 13. Each of the circular dots 106, 108, 110 and 112 extends horizontally through two positional units, and there are four positional units between the firing time for each of the dots.

By way of contrast, the three print bars 100, 102 and 104 along the first horizontal row are formed by the three print firing signals 116 from the print wire drivers 68 to the print coils 92 at the times represented by positional indicators 1, 7 and 13. Each of the oblong print bars of the character matrix in the present invention extends horizontally through four positional units and the print wire 90 is restricted from firing any sooner than six positional units, which is not more than three times along a horizontal row for any character appearing in the font of characters of FIGS. 4–70. The six positional spaces occurring between print wire firings in the character matrix pattern of the present invention are equivalent to a 50% gain over the area covered by the four positional spaces between print wire firings of the prior art dot matrix character matrix pattern.

While the invention has been particularly shown and described with reference to the preferred embodiments thereof it will be understood by those skilled in the art that various changes in form and detail may be made therein without departing from the spirit and scope of the invention. The present invention may be used in conjunction with impact matrix printers other than the serial wire matrix printer described above, such as the bar matrix and helix matrix printers.

I claim:

1. An arrangement for printing characters in a matrix printer, comprising:

means for relatively moving a print mechanism along successive print lines of a document to be printed, said print lines comprising characters arranged in accordance with a matrix character format having a predetermined number of possible firing times therein, said matrix character format having a predetermined number of rows and columns, none of said rows overlap another row and none of said columns overlap another column;

storage means for storing character configuration information of individual characters to be printed in said successive print lines;

means for providing print firing signals to said print mechanism, said print firing signals being derived from the character configuration information stored in said storage means, and said print firing means being operable in timed relation with relative movement of said print mechanism along said successive print lines to supply firing signals as required; and at least one print element in said print mechanism, said print element comprising an elongated impact member, said impact member having an impact surface with an elongated cross-sectional area, said impact surface having its longitudinal dimension extending in the same direction as the direction of relative movement of said print mechanism along said successive print lines and said longitudinal dimension exceeding the lateral dimension of said impact surface area normal to the direction of movement of said print mechanism along said print lines, said longitudinal dimension of said impact surface area extending over a plurality of said columns, said lateral dimension of said impact surface area being approximately equal to the lateral dimension of one of said rows and said print firing signals means being operable to print a character having no overlapping imprints from said impact surface areas of said print element, whereby the number of print firing signals required to be applied to said print mechanism in order to effect formation of said individual characters during printing operations is less than that required with print elements having impact members of uniform cross-sectional impact surface area.

2. The arrangement for printing characters in a matrix printer of claim 1 and further comprising at least one additional print element, wherein said print elements are arranged in said print mechanism such that said elongated impact members of said print elements have their longitudinal dimensions extending in the same direction as the direction of relative movements of the print mechanism.

3. An arrangement for printing characters in a matrix printer of claim 2, wherein the number of said print elements is equal to the number of rows in said matrix character format.

4. The arrangement for printing characters in a matrix printer of claim 2, wherein said matrix character format comprises a matrix arranged in seven rows and sixteen columns, said matrix format having thirteen possible firing locations therein.

5. The arrangement for printing characters in the matrix printer of claim 4, wherein said impact surface area of each of said elongated impact members is dimensioned to extend four columnar positional units in width and one row in height, said matrix character format having six positional units between said print firing signals in a row of said character matrix format.

6. An arrangement for printing characters in a serial wire matrix printer, comprising:
means for relatively moving a print mechanism along successive print lines of a document to be printed, said print lines comprising characters arranged in accordance with a matrix character format having a predetermined number of possible firing times therein, said matrix character format having a predetermined number of rows and columns, none of said rows overlap another row and none of said columns overlap another column;
storage means for storing character configuration information in accordance with said matrix character format for individual characters to be printed in said successive print lines;
means for providing print firing signals for said print mechanisms, said print firing signals being derived from the character configuration information stored in said storage means, said print firing means being operable in timed relation with relative movement of said print mechanism along successive print lines to supply firing signals as required; and
a plurality of elongated impact wire elements arranged in a column in said print mechanism, each of said impact wire elements having an impact surface with an elongated cross-sectional area, each of said impact surfaces having its longitudinal dimension extending in the same direction as the direction of relative movement of said print mechanism along successive print lines and said longitudinal dimension exceeding the lateral dimension of said impact surface area normal to the direction of movement of said print mechanism along said print lines, said longitudinal dimension of said impact surface area of each of said impact wire print elements extending over a plurality of said columns, said lateral dimension of each of said impact wire print elements being approximately equal to the lateral dimension of one of said rows and said print firing signals means being operable to print a character having no overlapping imprints from said impact surface areas of said impact wire elements, whereby the number of firing signals required to be applied to said print mechanism in order to effect formation of said individual characters during printing operations is less than that required with impact wire elements having a uniform cross-sectional impact surface area.

7. The arrangement for printing characters in a serial wire matrix printer of claim 6, wherein the number of said impact wire print elements is equal to the number of rows in said matrix character format.

8. The arrangement for printing characters in a serial wire matrix printer of claim 7, wherein said matrix character format comprises a matrix arranged in seven rows and sixteen columns, said matrix format having thirteen possible firing locations therein.

9. The arrangement for printing characters in a serial wire matrix printer of claim 8, wherein said impact surface area of each of said elongated impact wire print elements is dimensioned to extend four columnar positional units in width and one row in height, said matrix character format having six positional units between said print firing signals along a row in said character matrix format.

* * * * *